United States Patent
Kotola et al.

(10) Patent No.: US 6,321,257 B1
(45) Date of Patent: Nov. 20, 2001

(54) METHOD AND APPARATUS FOR ACCESSING INTERNET SERVICE IN A MOBILE COMMUNICATION NETWORK

(75) Inventors: Sakari Kotola, Tokyo (JP); Teemu Tarnanen, Espoo (FI); Patrik Gustafsson, Irving, TX (US)

(73) Assignee: Nokia Telecommunications Oy, Espoo (FI)

( * ) Notice: Subject to any disclaimer, the term of this patent is extended or adjusted under 35 U.S.C. 154(b) by 0 days.

(21) Appl. No.: 09/068,774
(22) PCT Filed: Sep. 15, 1997
(86) PCT No.: PCT/FI97/00547
§ 371 Date: Jan. 15, 1999
§ 102(e) Date: Jan. 15, 1999
(87) PCT Pub. No.: WO98/11744
PCT Pub. Date: Mar. 19, 1998

(30) Foreign Application Priority Data

Sep. 16, 1996 (FI) .......................................... 963659

(51) Int. Cl.[7] .................................................. G06F 13/00
(52) U.S. Cl. .......................... 709/219; 709/206; 709/313; 455/422; 455/426
(58) Field of Search .................................. 709/206, 217, 709/218, 219, 225, 227, 229, 230, 232, 313; 455/5.1, 426, 422

(56) References Cited

U.S. PATENT DOCUMENTS

| | | |
|---|---|---|
| 5,392,452 | 2/1995 | Davis . |
| 5,809,415 * | 9/1998 | Rossmann ............................. 455/422 |
| 5,943,399 * | 8/1999 | Bannister et al. ................ 379/88.17 |
| 5,946,629 * | 8/1999 | Sawyer et al. ....................... 455/466 |

FOREIGN PATENT DOCUMENTS

| | | |
|---|---|---|
| 777 394 | 6/1997 | (EP) . |
| 503 752 | 8/1996 | (SE) . |
| 95/08900 | 3/1995 | (WO) . |
| 96/09714 | 3/1996 | (WO) . |
| 97/08906 | 3/1997 | (WO) . |

* cited by examiner

*Primary Examiner*—Viet D. Vu
(74) *Attorney, Agent, or Firm*—Pillsbury Wintrop LLP

(57) ABSTRACT

Internet service in a digital mobile communication network by means of short message service. The short message service center is connected to the Internet network and uses the HTML, HTTP, and TCP/IP Internet network protocols. Short messages are transferred between the service center and mobile stations. The user submits to the service center a short message containing an identifier of a WWW servicer via the Internet network, receives the WWW page and stores it. The relevant part, which maybe identified by a predetermined criterion, common to all subscribers, or based on a criterion received from the mobile station, such as a keyword, is separated from the WWW page and sent to the mobile station in a short message. The mobile station processes the received message and displays it to the user.

26 Claims, 2 Drawing Sheets

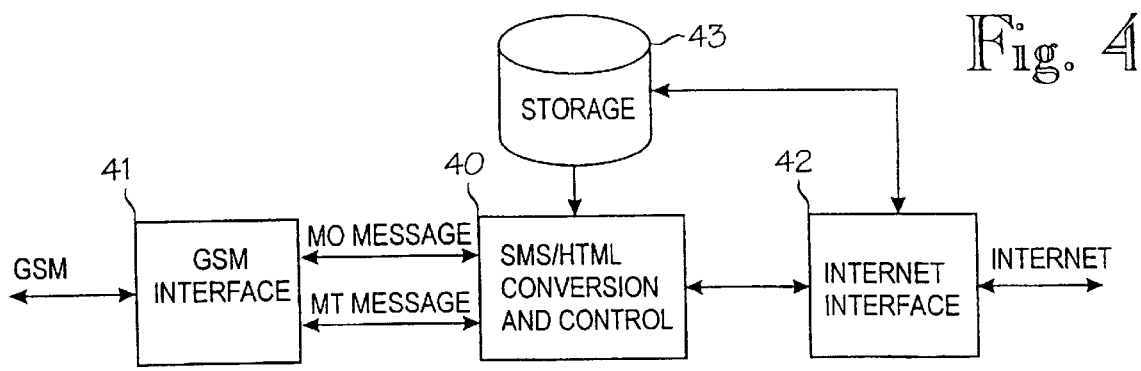
Fig. 4
| KEYWORD | URL |
|---------|-----|
| BUS | WWW.BUS.COM/TIMETABLE |
| WEATHER | WWW.FORECAST.FI |
| FLIGHT | WWW.FINNAIR.FI |
| RATE | WWW.REUTERS.COM |
| MOVIES | WWW.RADIOCITY.FI/MOVIES |
Fig. 5
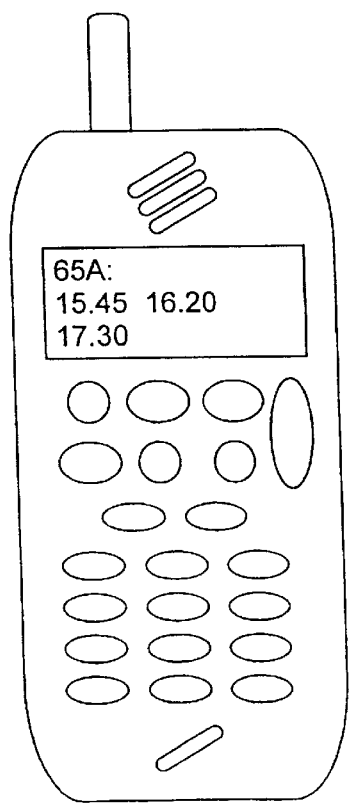
Fig. 6

METHOD AND APPARATUS FOR ACCESSING INTERNET SERVICE IN A MOBILE COMMUNICATION NETWORK

This application is the national phase of international application PCT/FI97/00547 filed Sep. 15, 1997 which designated the U.S.

BACKGROUND OF THE INVENTION

The invention relates generally to digital mobile communication systems and more particularly to providing data service in a mobile communication system.

Mobile communication systems refer, in general, to different telecommunication systems providing personal wireless data transmission while subscribers roam the system area. A typical mobile communication system is the public land mobile network PLMN.

Besides conventional speech transmission, digital mobile communication systems provide a plurality of other services: short messages, facsimiles, data transmission, etc. Of these, the data transmission service, in particular, provides a mobile subscriber a chance of wireless access to nearly all data services of fixed networks.

The use of the Internet data network in fixed networks has increased very rapidly. As is well known, the Internet network actually comprises a large number of smaller interconnected networks. Data transmission in Internet is packet-switched in accordance with the TCP/IP protocol (Transmission Control Protocol/Internet Protocol). The growing popularity of Internet is primarily due to a system called World Wide Web (WWW). The WWW system consists of servers in the Internet network and customer programs used by these servers, called WWW browsers. The information in the WWW servers is arranged into pages which are the basic units of the WWW technique, as whole pages are always transferred between a server and a browser. In addition to text, the page may also contain graphics and various other file types, such as voice and video. The pages used by the WWW technique are described with the HTML language (Hyper Text Mark-up Language). Information on text format, graphics, etc. is coded among the actual text contents by HTML tags. The browser program uses these tags to give a WWW page the desired format.

There is a connection between a WWW server and a user only during the transfer of a WWW page to a user. This means that when requesting a WWW page, a user sends a transfer request to a WWW server which sends the requested page back via the line. Transfer requests and WWW pages are transferred by the HTTP protocol (Hyper Text Transfer Protocol). The receiver's browser program restores the WWW page received into the right form in accordance with the HTML language. A transferred WWW page is stored in the memory of the user's computer, the user being able to browse the page on his/her own screen. The addressing format of the Internet WWW servers is URL (Uniform Resource Locator).

Through the data transmission services of mobile communication systems, the numerous information sources of the Internet network are, in principle, available to mobile subscribers, too. However, the use of data transmission services typically requires a mobile station provided with data transmission properties, and a computer connected thereto. At present, mobile stations including an integrated computer, such as the Nokia Communicator, are available. However, these are relatively expensive alternatives and hence not suitable to occasional usage by an ordinary mobile subscriber.

The Internet network, however, offers numerous information sources which could be useful to an ordinary user, too. These could include e.g. flight, train, bus schedules, weather and traffic reports, telephone number and address information etc. At present, most of these services are free of charge and available to everybody. Internet is also commonly used in companies for internal services. Thus it would be advantageous to render the various information sources offered by Internet available to users of mobile stations without any data transmission facilities.

DISCLOSURE OF THE INVENTION

It is an object of the present invention to retrieve information from the Internet network without the need to use the data transmission service of a mobile communication network, or a browser program of World Wide Web pages in a mobile equipment.

This is achieved with a method of accessing a data network in a digital mobile communication system providing short message service. The method is characterized by the steps of transferring a short message including an identifier indicating a Word Wide Web (WWW) page in the Internet network from a mobile station over the mobile communication network to a short message service centre having access to the Internet network either directly or via a computer in connection with said service centre, communicating towards the Internet network using the protocols of the Internet network and retrieving said WWW page indicated by said short message, or a part of said WWW page, converting a relevant part of the contents of said WWW page into a short message, sending the short message over the mobile communication network to the mobile station, displaying the contents of the short message on the display of the mobile station.

The invention also relates to a short message service centre for a digital mobile communication system providing short message service, the short message service centre comprising: first means for accessing a mobile communication network for transferring short messages between the short message service centre and mobile stations, and second means for accessing a data network. The service centre is characterized in that said data network is the Internet network, said second means comprise means for retrieving Word Wide Web (WWW) pages from the Internet network using the protocols of the Internet network in response to a short message sent by a mobile station, the message either directly or indirectly indicating said WWW page, and that the short message service centre further comprises means for converting the relevant part of the contents of the WWW page into a short message to be sent to the mobile station via the mobile communication network.

The invention further relates to an equipment for connecting the short message service centre of a digital mobile communication system to a data network. The equipment is characterized in that said data network is the Internet network, and that the equipment comprises means for retrieving Word Wide Web (WWW) pages from the Internet network using the protocols of the Internet network in response to a short message sent by a mobile station to the short message service centre, the message indicating said WWW page, and means for converting the relevant part of the contents of the WWW page into a short message to be sent to the mobile station via the short message service centre and the mobile communication network.

In the present invention, a mobile subscriber searches the Internet WWW pages for information by the aid of the short message service of the mobile communication network. For this purpose the short message service centre or other equipment in connection thereto is provided with access to the Internet network and uses HTML, HTTP, and TCP/IP protocols towards Internet. In addition, the short message service centre is connected to a mobile communication system in the usual manner such that short messages are transferred between the short message service centre and mobile stations in a manner defined for the mobile communication system.

When requiring information from an Internet WWW page, a mobile user sends to the service centre a short message including an identifier for directly or indirectly indicating said WWW page. Direct indication includes e.g. the address of the WWW page, URL. URL addresses are often quite long and hard to remember, and it is not always useful to transfer them to the service centre in a short message. In an embodiment of the invention, a mobile station sends, instead of an address, a short keyword indirectly indicating the desired WWW page. The short message service centre or said other equipment comprises a table for linking the keywords and the addresses of WWW pages.

Having received a short message, the short message centre or said other equipment contacts the desired WWW server via Internet, receives therefrom the WWW page and stores it.

The length of a short message is limited, e.g. 160 characters, whereas a WWW page may comprise an enormous amount of information. This is why in the primary embodiment of the invention the short message service centre or said other equipment is provided with means for converting or "compressing" the WWW page received from Internet into a form suitable to the transmission capacity of the short message service of the mobile communication system. In an embodiment of the invention, the short message service centre or said other equipment separates or "filters" only the relevant part of a WWW page and sends it in a short message to the mobile station. The part of a WWW page containing relevant information may be identified by a predetermined fixed criterion, common to all subscribers, or it may be based on a criterion received from the mobile station, such as a password. This password may be included in the short message sent by the mobile station, together with the identifier of the WWW page. The short message service centre or said other equipment searches the WWW page received and stored for the point including said relevant information and places it in a short message. The length of the text to be placed in a short message can be limited e.g. by character strings used on WWW pages, such as HTML tags. In this way a paragraph of a WWW page including the desired information, for example, may be placed in the s short message.

The mobile station receives and processes the "Internet" short message received from the short message centre as a normal short message. The short message may be displayed on the mobile station screen en in the usual manner. Thus no data transmission properties or WWW browsers are required in the mobile station for the use of the Internet WWW service. The only technical requirement is that the mobile station be provided with a conventional short message facility. In addition, the user typically has to have a subscriber contract with a short message service e centre supporting the service according to the invention.

The invention does not require any changes in the mobile e communication network, either, but a short message centre provided with the new properties required by the invention, or with other equipment comprising them, may be connected to the mobile communication network in a standard manner.

Thus the invention may be used to easily provide existing mobile communication networks with an Internet net work access, and to offer it to mobile station already in the network and comprising a short message facility. In principle, the mobile station user does not even have to be aware of the fact that the information required is retrieved from Internet. The user simply sends an information inquiry in the form of a short message t o the short message service centre and obtains the desired information in a reply message.

BRIEF DESCRIPTION OF THE DRAWINGS

The primary embodiments of the invention are described below with reference to the attached drawings, in which FIG. 4 is a block diagram of a service centre according to a primary embodiment of the invention, FIG. 5 is a conversion table stored in a data base 43, FIG. 6 shows a mobile telephone with the contents of a short message displayed on the screen.

PREFERRED EMBODIMENTS OF THE INVENTION

The present invention may be applied to all mobile communication systems supporting circuit switched speech and data services and using short message service. In the present application, short message service refers to the transfer of a short text message between a mobile station and a special short message service unit without the need to set up a point-to-point connection. This is why the transfer of a short message may take place even when in the mobile station there is a speech or data call in progress on a circuit-switched point-to-point connection. Short message transfer is limited to one message, i.e. the transfer of one message constitutes the whole transaction. Thus, short message service is totally different from packet-switched data transmission.

In the following the invention will be described in connection with the digital GSM (Global System for Mobile Communication). Regarding the invention, the operation and structure of the mobile communication system are not relevant, and hence they are described only to a degree that will assist in comprehending short message service. As to a more precise description of the GSM system, reference in made to the GSM recommendations and the publication "The GSM System for Mobile Communications", M. Mouly & M. Pautet, Palaiseau, France, 1992, ISBN:2-9507190-0-7.

Figure 1:
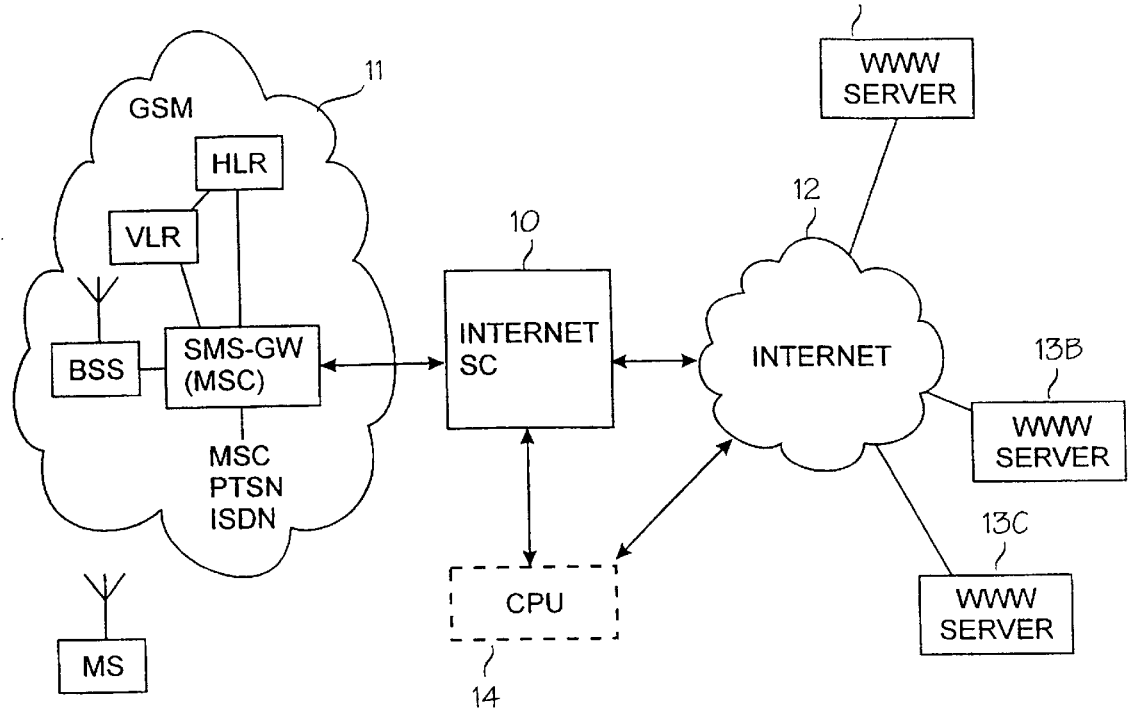
FIG. 1 is a system diagram illustrating how a mobile communication network and the Internet network a re interconnect ed by a short message service centre according t o the invention.

Referring to FIG. 1, a mobile switching centre MSC switches incoming and outgoing calls. It also performs tasks typical of mobile telephone traffic, such as subscriber location management, in co-operation with the network subscriber registers VLR and HLR. The HLR is a subscriber's home register for permanent storage of subscriber data. The visitor location register VLR is a local register to which the subscriber data is copied from the HLR when a mobile subscriber visits the area of the VLR. Mobile stations MS communicate with the centre MSC via base station systems BSS. The BSS consists of a base station controller BSC and base stations BTS, i.e. fixed radio transceivers via which the mobile stations MS communicate with the mobile communication network over the radio path.

The European Telecommunications Standards Institute (ETSI) standard GSM 03.40 describes the point-to-point (PP) short message service (SMS) of the GSM system. The SMS of the GSM network offers means for transferring short messages with limited length (160 ASCII characters) between mobile stations MS and a short message service centre SC 10 which is outside the GSM network 11. Mobile originated (MO) and mobile terminated (MT) short message transmissions are defined as separate services. MO short messages are transferred from the MS to the service centre SC. These short message may be destined for other mobile station users or for subscribers on a fixed network. MT short messages are transferred from the service centre SC to the MS. These short messages may have arrived at the service centre SC from other mobile station users or from other sources. The protocol employed between the SC and the MS is called SM-TP (Short Message Transport Protocol).

The service centre SC is connected to the mobile communication network via a certain MSC, called the SMS-Gateway MSC when MT short messages are involved, and SMS-Interworking MSC when MO short messages are involved. The present application uses a common name SMS-Gateway (SMS-GW). The SMS-GW relays short messages between a MS and the SC and performs the HLR (and VLR) inquiries needed for an MT message in a call. The service centre SC is given a dedicated ISDN number in the number space of the GSM network, and the MS uses the ISDN number for addressing a short message to the SC.

Figure 2:
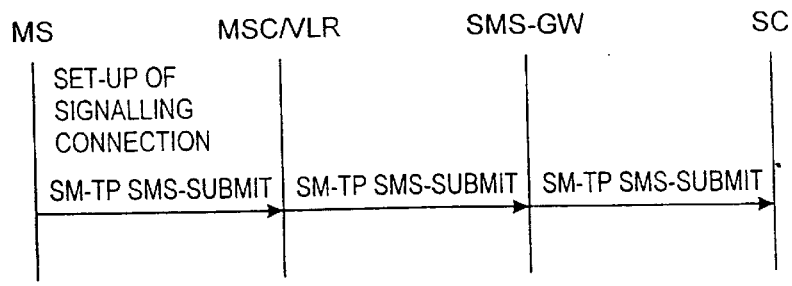
FIGS. 2 and 3 are signalling diagrams illustrating the transfer of an MO short message and an MT short message, respectively.

In the following the transfer of MO and MT short messages will be briefly described with reference to FIGS. 2 and 3.

When wishing to send a short message (FIG. 2), a user has to key in at least its contents and the ISDN number of the service centre SC that will process the message. Sending a short message requires that a signalling connection (reservation of radio resources (RR)) be set up between the mobile station and the serving MSC, if such a connection does not yet exist. This is carried out in the same way as for other communication. In order to separate a short message from potential other signalling at the link layer, a link identifier SAPI 3 (Service Access Point Identifier) is applied to it, whereas the SAPI of the signalling is 0. An MO short message, called an SM-TP SMS-SUBMIT message, is sent via the serving MSC and SMS-GW (on the basis of the ISDN number) to the right service centre SC.

Figure 3:
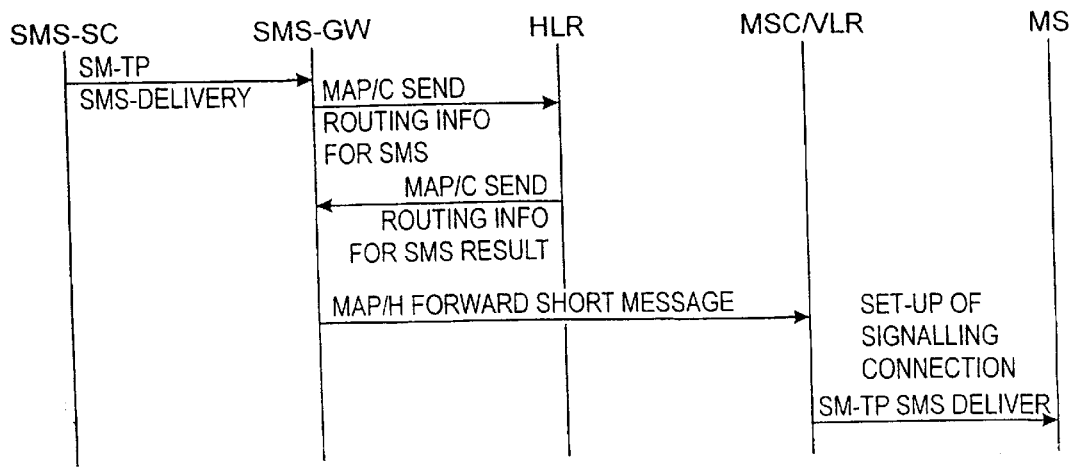

Transmission of an MT short message is somewhat more complicated (FIG. 3). The service centre initiates short message transmission by sending to the SMS-GW a message SM-TP SMS-DELIVER containing at least the contents of the short message and the MSISDN number of the addressed mobile subscriber. The SMS-GW derives the subscriber's HLR address from the MSISDN number and inquires of the HLR about routing information by the message MAP/C SEND ROUTING INFO FOR SMS. HLR provides the routing information (=the address of the serving MSC) by the message MAP/C SEND ROUTING INFO FOR SMS RESULT (possibly first after making a supplementary inquiry to the VLR). The SMS-GW then sends a short message, MAP/H FORWARD SHORT MESSAGE, to the serving MSC. The MSC sets up a signalling connection if it has not yet been set up, and sends to the MS a short message called SM-TP SMS DELIVER. The MS receives and stores the short message and alerts the user.

It should be noted that, as regards the invention, it is insignificant how the short message service support has been implemented in the mobile communication system. In the GSM system, for example, the invention is applicable to existing networks supporting short message service. An example of such a network is the GSM network of Radiolinja Oy in Finland. The mobile station may also be any kind of mobile station supporting short message service. An example is the Nokia 2110 GSM.

In the present invention the service centre SC is connected to the Internet network 12 such that it can be used as a gateway between the GSM network and the Internet network. The interface between the short message centre SC and the SC centre may be a direct interface, or the SC may be in connection with a separate computer equipment having access to the Internet network 12. Such a separate equipment is illustrated by a CPU 14 in FIG. 14.

In this way the invention SC brings the information sources of the Internet network 12 to the use of mobile subscribers via short message service. A large number of users, local networks and servers, of which FIG. 1 shows only three WWW servers 13A, 13B, and 13C, are connected to the Internet network 12.

The block diagram of FIG. 4 shows an example of a service centre SC according to the invention. The interface 41 between the GSM network and the service centre SC maybe similar to that in present short message service centres.

A basic element in present short message service centres SC (in computers) is that they can be connected to data networks, a property which may also be utilized at the physical level of Internet connections. The service centre SC uses HTTP and HTML protocols towards the Internet network 12. The HTTP protocol again uses TCP/IP interfaces. WWW server and customer programs usable in a service centre computer (computers) SC in retrieving WWW pages according to the HTP and HTML protocols from the Internet network are commercially available for different operating systems (such as Unix). In FIG. 4, an Internet interface block 42 represents these Internet-specific operations of a service centre SC.

A conversion and control unit 40 controls the retrievals of WWW pages via the Internet interface 42 and the transmission and reception of short messages via the GSM interface 41. The control unit 40 converts a short message received by the GSM interface into a WWW page request to be carried out via the Internet interface 42. Correspondingly, the control unit 40 filters the relevant part of the retrieved WWW page and places it as the contents of the short message which is sent via the GSM interface to the MS. In addition the service centre comprises a data base 43 for storing retrieved WWW pages and various parameters, conversion tables etc. required by the control unit.

If the service centre SC is connected to the Internet network by means of a separate computer equipment CPU14, the operational blocks of FIG. 4 may be decentralized between the SC and the CPU14. For example, the GSM interface 41 may be a normal short message service centre SC, whereas the control unit 40, the Internet interface 42, and the memory 43 are located in the separate equipment CPU 14. This is an advantageous alternative particularly when the service according to the invention is introduced into old short message service centres.

When requiring information from an Internet WWW page, a mobile user submits a short message addressed (ISDN number) to the service centre SC, the message containing an identifier for directly or indirectly indicating said WWW page. Direct indication contains e.g. the WWW page address, URL. Examples of URL addresses are http://www.nokia.com and http://www.uspto.gov/. In an embodiment of the invention, instead of an URL address, the user keys in a short keyword in the short message indirectly indicating the desired WWW page. The data base 43 of the service centre SC comprises a table for linking keywords and WWW page addresses. FIG. 5 shows an example of such a table. For example, when requiring information on bus schedules from a WWW page whose URL is http://www.bus.com/timetable, the user sends the code BUS in the short message to the service centre SC.

A short message is transferred to a service centre SC as a normal MO short message. Having received the short message, the GSM interface unit 41 forwards the contents to the control unit 40. On the basis of the keyword, the control unit 40 retrieves the URL address from the table. The control unit 40 then preferably checks if said WWW page has been retrieved previously and is stored in the data base 43. If the data base 43 does not include the page, the control unit 40 retrieves the WWW page corresponding to the URL address from the Internet network via the interface 42 and stores it.

The length of a short message is limited, e.g. 160 characters, whereas a WWW page may contain an enormous amount of information. In most cases the user is interested only in certain information that is hidden among other data. Therefore, in a primary embodiment of the invention, the control unit 40 separates or "filters" only the relevant part of the WWW page and sends it in a short message to the mobile station.

The HTML language depicting WWW pages consists of tags entered in the text within angle brackets <>. Such tags are e.g. the paragraph tag <P>, the page header tag <TITLE>, change of paragraph <P>or <BR>, a list <UL>, etc. These HTML tags appearing on WWW pages may be used to define the size of the text portion to be placed in a short message. Other arbitrary character strings may also be used alternatively or in addition. In this way e.g a paragraph (the text between two <P>tags) of a WWW page including the desired relevant information may be placed in a short message. By using standard HTML tags as templates, all current WWW information is rendered available to the short message service without any changes or with slight changes to WWW pages. In the invention, the HTML text is converted into readable format before transmission. The text is also compressed by omitting unnecessary white fields from the text. The HTML tables are converted into separate paragraphs.

The part of a WWW page containing relevant information may be identified by a predetermined fixed criterion, common to all subscribers, or it may be based on a criterion received from the mobile station, such as a keyword.

For example, a short message including the keyword WEATHER, causes a WWW page containing weather reports to be retrieved from Internet.

When using a fixed criterion, a paragraph dealing with tomorrow's weather, for example, may be separated from this page.

When using a keyword or other search text, the WWW page is searched for the corresponding text between predetermined HTML tags. The corresponding text block is then returned to the MS in a short message (usually converted from the HTML language into a readable language). A mobile user may include the keyword in a short message requesting information from the WWW page.

A MS may send the inquiry BUS 65A, for example, in a short message. The control unit of the service centre SC retrieves from the data base the URL http://www.bus.com/timetable corresponding to the code BUS. The control unit then checks if the WWW page corresponding to the URL exists in the data base. If not, the control unit 43 retrieves said WWW page from Internet 12 via the interface 42 and stores it in the data base 43. A stored WWW page may have e.g. the following appearance:

<BODY>
<P>Bus company Limited Timetable </P>,
<P>64:14.45 15.10 15.30 15.55 </P>
<P>65A:15.45 16.20 17.30 </P>
</BODY>
<HTML>

The control unit 40 searches the WWW page for the paragraph including the keyword 65A and deletes superfluous information. In this case the short message to be sent to the mobile station MS would look like this:

65A: 15.45 16.20 17.30

The control unit 40 sends this short message via the GSM interface 41 to the GSM network where it is relayed to the MS in the same manner as described in FIG. 3. The MS receives and processes the "Internet" short message received from the short message centre as a normal short message. The short message may be displayed on the mobile station screen in the usual manner, as illustrated in FIG. 6.

Another way to proceed is to use WWW pages with inquiry scripts, i.e. inquiry expressions drawn up in a command language. This means that it is the WWW server maintaining the WWW page that filters the relevant part of the WWW page according to the inquiry it received and returns the relevant part as a WWW page to the service centre SC. The service centre has to be aware of the inquiry format of each WWW page (service). In addition, the mobile subscriber should be aware of all inquiry keywords. With this type of functionality the searches would, however, be more accurate.

For example, in response to a short message including the above described inquiry BUS 65A, the service centre SC could send to the WWW server of the WWW page http://www.bus.com/timetable the inquiry http://www.bus.com/timetable?bus=65A. According to the inquiry parameters and the inquiry script of the WWW page, the WWW server creates a reply which is sent in HTML format (a WWW page) via Internet 12 back to the service centre SC. The reply from the WWW server could look like this:

<BODY>
Timetable for bus 65A:
15.45 16.20 17.30
</BODY>
<HTML>

The control unit 40 of the service centre SC converts and cleans up the reply into readable text format, the final short message looking like this:

Timetable for bus 65A: 15.45 16.20 17.30

In the above described cases the control unit 40 sends only the relevant part of a WWW page in a short message. In an embodiment of the invention, the control unit has, however, an optional operation mode wherein it does not search for the relevant part of a WWW page, but instead sends the whole page, as a cleaned-up version: the HTML text is converted into readable format and the superfluous empty fields are deleted in order to compress the text and reduce message size. This is similar to the procedure performed above in the last example.

In still another embodiment of the invention the control unit 40 has an optional operation mode wherein the contents of a WWW page are sent in HTML format in a short message. Only the superfluous empty fields are deleted to reduce the size of the short message.

In the above the invention has been illustrated by means of primary embodiments. The invention is not, however, limited to the solutions presented, but can be varied within the scope and spirit of the attached claims.

What is claimed is:

1. A method for accessing a data network in a digital mobile communication system providing short message service, the method comprising:
   transferring a first short message including at least one keyword indicating a Word Wide Web (WWW) page in the Internet network from a mobile station over the mobile communication network to a short message service centre having access to the Internet network in connection with said service centre,
   converting the keyword into the Uniform Resource Locator (URL) address of the WWW page,
   communicating towards the Internet network using the protocols of the Internet network and retrieving said WWW page, or a part of said WWW page based on said converted URL address,
   converting a relevant part of the contents of said WWW page into a second short message,
   sending the second short message over the mobile communication network to the mobile station,
   displaying the contents of the second short message on the display of the mobile station.

2. A method as claimed in claim 1, wherein the converting of the keyword into the Uniform Resource Locator (URL) address of the WWW page is performed by a keyword/URL conversion table.

3. A method as claimed in claim 1, wherein said conversion of the WWW page into the second short message comprises identifying said relevant part on the WWW page by a search criterion received in said first short message from the mobile station.

4. A method as claimed in claim 3, wherein said search criterion comprises one or more keywords.

5. A method as claimed in claim 1 wherein said conversion of the WWW page into said first short message comprises separating said relevant text part from the WWW page by a predetermined character string.

6. A method as claimed in claim 5, wherein said character string is a Hyper Text Mark-Up Language (HTML) tag in the WWW page.

7. A method as claimed in claim 6, wherein the whole of said text and the HTML tag corresponding thereto are some of the following: paragraph and HTML tag <P>; page header and HTML tag <TITLE>; paragraph change and HTML tag <P> or <13R>; and a list and HTML tag <UL>.

8. A method as claimed in claim 1, further comprising:
   sending a search criterion to the WWW page WWW server in the Internet network as indicated by the first short message,
   separating said relevant part of said WWW page in the WWW server on the basis of the search criterion,
   returning a modified WWW page from said WWW server in response, the page containing only said relevant part,
   converting the WWW page into the second short message and sending the second short message to the mobile station.

9. A method as claimed in claim 1, wherein said conversion of the WWW page into the second short message comprises optimizing the length of the second short message by deleting superfluous empty are as from said relevant part.

10. A method as claimed in claim 1, wherein said conversion of the WWW page into the second short message comprises converting said relevant part from HTML format into normal text format.

11. A method as claimed in claim 1, wherein said communication with the Internet network and said conversion of the WWW page into a short message is carried out in said separate computer connected with the short message service centre.

12. A short message service centre for a digital mobile communication system providing short message service, the short message service centre comprising:
    first device configured to access a mobile communication network for transferring short messages between the short message service centre and mobile stations, and
    second device configured to access an Internet network, said second including means for retrieving Word Wide Web (WWW) pages from the Internet network using the protocols of the Internet network in response to a first short message sent by a mobile station, the first short message indicating said WWW page by using a keyword, and
    the short message service centre further including a converter for converting a relevant part of the contents of the WWW page into a short message to be sent to the mobile station via the mobile communication network.

13. A short message service centre as claimed in claim 12, wherein the short message service centre includes means for converting the keyword into Uniform Resource Locator (URL) address of the WWW page.

14. A short message service centre as claimed in claim 12, wherein the converter includes means for identifying said relevant part on the WWW page by a search criterion received in said first short message from the mobile station.

15. A short message service centre as claimed in claim 12, wherein the converter includes means for separating said relevant text part from the WWW page by a predetermined character string of the WWW page including a Hyper Text Mark-Up Language (HTML) tag.

16. A short message service centre as claimed in claim 15, wherein said relevant text part and the HTML tag corresponding thereto are some of the following: paragraph and HTML tag <P>; page header and HTML tag <TITLE>; paragraph change and HTML tag <P> or <BR>; and a list and HTML tag <UL>.

17. A short message service centre as claimed in claim 12, wherein the converter includes means for optimizing the length of the short message by deleting superfluous empty areas from said relevant part, and for converting said relevant part from HTML format into normal text format.

18. A short message service centre as claimed in claim 12, wherein said second device is located in a computer communicating with the short message service centre.

19. An equipment for connecting the short message service centre of a digital mobile communication system to an Internet network, the equipment comprising:
    a first device for retrieving Word Wide Web (WWW) pages from the Internet network using the protocols of the Internet network in response to a short message sent by a mobile station to the short message service centre, the message indicating said WWW page, and a second device for converting the relevant part of the contents of the WWW page into a short message to be sent to the mobile station via the short message service centre and the mobile communication network.

20. An equipment as claimed in claim 19, wherein the equipment includes a computer unit communicating with the short message service centre and having access to the Internet network.

21. A method for accessing an Internet network in a digital mobile communication system, wherein the mobile communication system provides a message service, the method comprising:

transferring a message including a keyword indirectly indicating a Word Wide Web (WWW) page in the Internet network from a mobile station over the mobile communication system to a message service centre having access to the Internet network;

converting the keyword into the Uniform Resource Locator (URL) address of the WWW page;

communicating towards the Internet network using the protocols of the Internet network and retrieving said WWW page, or a part of said WWW page, on the basis of the URL address;

converting a relevant part of the contents of said WWW page into a message;

sending the message over the mobile communication network to the mobile station; and displaying the contents of the message on a display of the mobile station.

22. A message service centre for a digital mobile communication system providing a message service, the message service centre comprising:

a first device configured to access a mobile communication network for transferring messages between the message service centre and mobile stations;

a second device for accessing Internet network;

a third device for storing information on the association between keywords and the Uniform Resource Locator (JRL) addresses of WWW pages, and for converting a keyword received in a message from a mobile station into the URL address of the WWW page;

a fourth device for retrieving Word Wide Web (WWW) pages from the Internet network using the protocols of the Internet network on basis of the URL address; and a fifth device for converting the relevant part of the contents of the WWW page into a message to be sent to the mobile station via the mobile communication network.

23. A method for retrieving information, comprising:

sending a message to a messaging service centre from a mobile station via a digital mobile communications system by a messaging service supported by said digital mobile communications system, said message containing at least one keyword as a search criterion and an identifier indicating a Word Wide Web (WWW) page in the Internet network, and said messaging service having access to the Internet network;

accessing a server having said WWW page via the Internet network by said messaging service centre;

retrieving at least part of the content of said WWW page to the messaging service centre;

converting, on the basis of said search criterion, relevant content of said WWW page into a content format having a reduced size which can be accommodated to by a response message;

sending said response message over said digital mobile communications system to the mobile station by the messaging service;

displaying the contents of the response message on the display of the mobile station.

24. A messaging service centre, comprising a first interface to a digital mobile communications system having a messaging service;

a second interface to an Internet network;

a device responsive to a message containing a keyword indirectly indicating a Word Wide Web (WWW) page in the Internet network received from a mobile station via said digital mobile communications network and said first interface, said device converting said keyword into Uniform Resource Locator (URL) address and retrieving at least part of contents of said WWW page from the Internet network via said second interface using the protocols of the Internet network on the basis of said URL address; and a converter for converting relevant content of said WWW page into a content format having a reduced size which is accommodated to by a response message, and sending said response message to said mobile station over said digital mobile communications system by means of said messaging service.

25. A method for retrieving information comprising:

sending a message to a messaging service centre from a mobile station via a digital mobile communications system by means of a messaging service supported by said digital mobile communications system without setting up a point-to-point connection between said mobile station and said messaging service centre, said message containing 1) at least one keyword as a search criterion and 2) an identifier indicating a Word Wide Web (WWW) page in the Internet network, and said messaging service having access to the Internet network;

accessing a server having said WWW page via the Internet network by said messaging service centre;

retrieving at least part of the content of said WWW page to the messaging service centre;

converting relevant content of said WWW page on the basis of said keyword into a content format having a reduced size which is accommodated to by a response message;

sending said response over said digital mobile communications system to the mobile station by the messaging service without setting up a point-to-point connection between said mobile station and said messaging service centre;

displaying the contents of the response message on the display of the mobile station.

26. A messaging service centre comprising:

a first interface to a digital mobile communications system having a messaging service providing messaging without need to set up a point-to-point connection between said mobile station and said messaging service centre;

a second interface to an Internet network;

a device responsive to a message containing at least one keyword indirectly indicating a Word Wide Web (WWW) page in the Internet network received from a mobile station via said digital mobile communications network and said first interface, said device converting said at least one keyword into a Uniform Resource Locator (URL) address and retrieving at least part of contents of said WWW page from the Internet network on the basis of said URL address via said second interface using the protocols of the Internet network;

a converter for converting the relevant part of said WWW page into a content format having a reduced size which is accommodated to by a response message, said converter sending said response message to said mobile station over said digital mobile communications.

* * * * *